June 14, 1960 V. L. FRANTZ 2,940,140
SHELL MOLDING PROCESS AND MEANS
Filed April 26, 1957 2 Sheets-Sheet 2

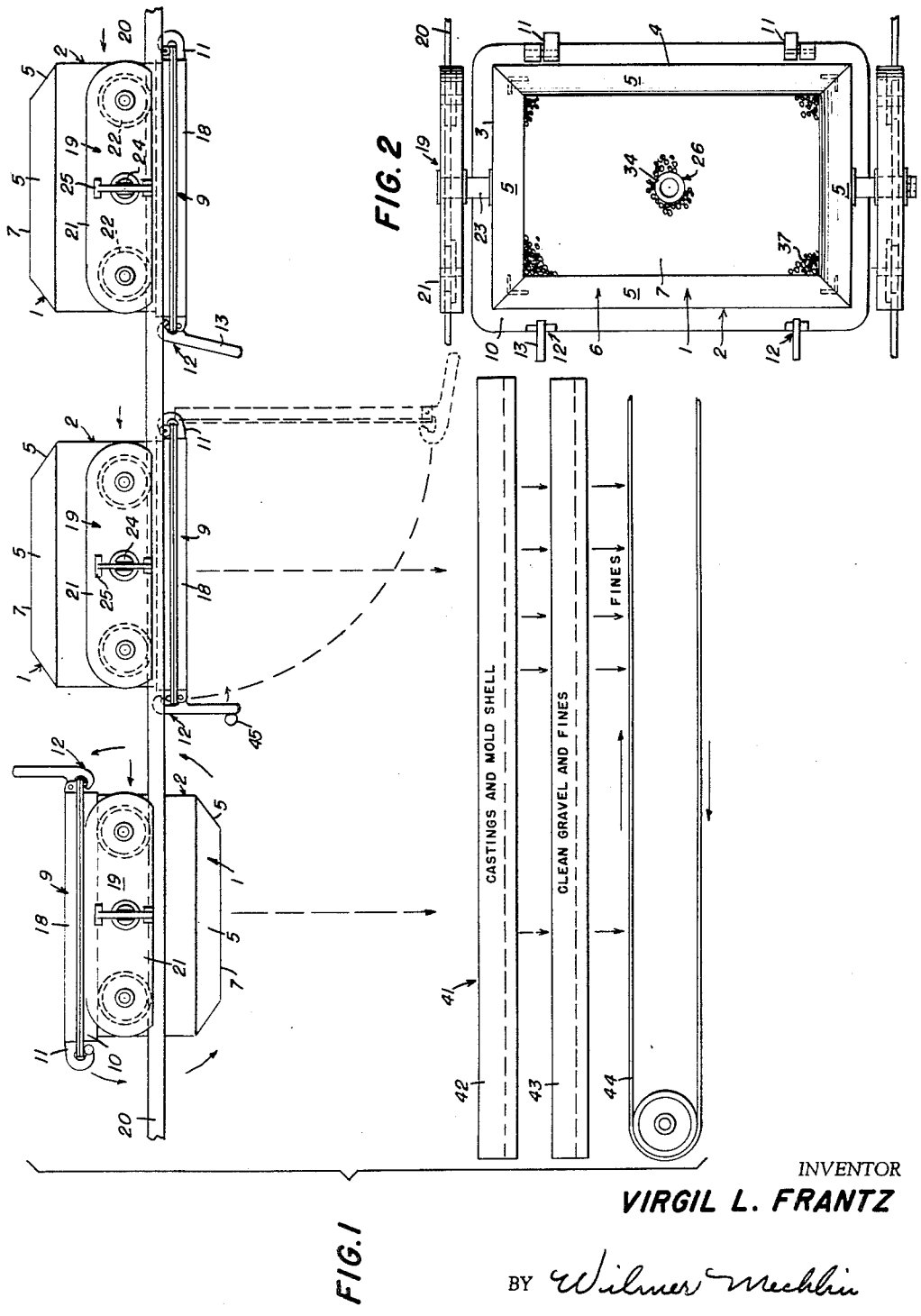

INVENTOR
VIRGIL L. FRANTZ

BY Wilmer Mechlin
ATTORNEY

United States Patent Office 2,940,140
Patented June 14, 1960

---

2,940,140

SHELL MOLDING PROCESS AND MEANS

Virgil L. Frantz, Salem, Va.

Filed Apr. 26, 1957, Ser. No. 655,367

19 Claims. (Cl. 22—20)

This invention relates to shell molding and particularly to a process and means for casting metal in shell molds.

In shell molding, making of the relatively thin mold by applying a mixture of fine sand and a thermosetting resin to a metal pattern contained in a pattern box and subjecting the mixture to heat during investment and subsequent curing has been perfected to the point where it presents no particular problem. However, the preparation of the mold for molding and the molding itself are areas in which the shell molding process as now practiced leaves something to be desired, both in the economy of the operation and in the precision of the product. The difficulty lies mainly in the necessity for backing up the thin frangible mold during molding or casting to prevent it from being blown out by the pressure of the gas escaping through the porous mold when expanded by the internal pressure of the molten metal.

In accordance with present practice, the mold sections, or cope and drag, which earlier were clamped together by stapling through abutting peripheral flanges or skirts, are bonded by applying a thermosetting resin in mounds or globs to the flanges and pressing the latter together to spread the resin while the sections are still hot. With its sections so bonded together, the mold generally is prepared for molding in one of two ways. In one, the mold is placed in a mold box having compressible sides and the box is filled from the top with shot which is pressed tight against the outside of the mold during molding by compressing the sides of the box. In the other, the mold is forced into a bed of sand or shot, covered with the same material and compressed during molding by applying weights to the top covering. Either way is time-consuming and requires highly skilled labor even to minimize blow-outs due to the formation of pockets in the backing material. There is the further objection to both that the need for applying force by external means during molding inevitably restricts the area available for the escape of gases.

The primary object of the present invention is to provide a process and means for improving shell molding in the above areas wherein the backing material is pressed uniformly against the mold during molding without use of weights or other outside pressure-applying means, whereby precision in casting is increased and the danger of blow-outs effectively eliminated.

Another object of the invention is to provide a mold box for shell molding which is of such arrangement and construction as to facilitate uniform distribution of the backing material about the mold and afford maximum area for escape of gases.

Another object of the invention is to provide a mold box for shell molding into which a mold may be inserted without pressure and in which the mold is so supported that the forces applied thereto, during loading of the box with backing material, act only to hold the mold sections together, thereby enabling the thickness of the resin bond between the sections to be reduced and correspondingly increasing the precision of the product.

An additional object of the invention is to provide a mold box for shell molding which is loadable with backing material and permits escape of gases through both top and bottom and which utilizes the expansive force of the molten metal to apply a wedging counter-action for pressing the backing material against the mold.

A further object of the invention is to provide a mold box for shell molding which is invertible for loading with backing material or dumping from top and bottom, and supports the mold during bottom loading on supporting means positioned intermediate its vertical limits and during subsequent top loading on a foraminous door hinged to its bottom.

Another object of the invention is to provide a mold box for shell molding which not only is loadable with backing material and dumpable through both top and bottom but exerts pressure from the top during molding counter to the expansive force of the metal by the wedging action of an upwardly tapered top portion closing the top of the box.

Another object of the invention is to provide a mold box of the character above described for use in shell molding which has a carriage mountable on a trackway for ready shifting between molding and dumping stations as well as during molding to afford space for escape of gases from its foraminous bottom.

A further object of the invention is to provide an improvement in the mold box loading, molding and dumping steps of a shell molding process, whereby these steps may be conducted with a minimum of relatively unskilled labor and on dumpintg, the backing material and any fine sand released by partial disintegration of the mold, are separated and recovered for reuse.

A further object of the invention is to provide an improved mold box and associated apparatus for use in shell molding, whereby manual handling is drastically reduced with corresponding reduction in the labor required.

Other objects and advantages of the invention will appear hereinafter in the detailed description, be particularly pointed out in the appended claims and be illustrated in the accompanying drawings, in which:

Figure 1 is a view showing in side elevation a preferred embodiment of the mold box of the present invention in each of its molding and bottom and top dumping positions and, somewhat schematically, associated apparatus for separating and recovering the materials dumped from the box;

Figure 2 is a plan view of the box of Figure 1 in its molding position;

Referring now in detail to the drawings in which like reference characters designate like parts, the present invention contemplates an improvement in shell molding which stems mainly from the use of a mold box of unique characteristics.

Figure 3:
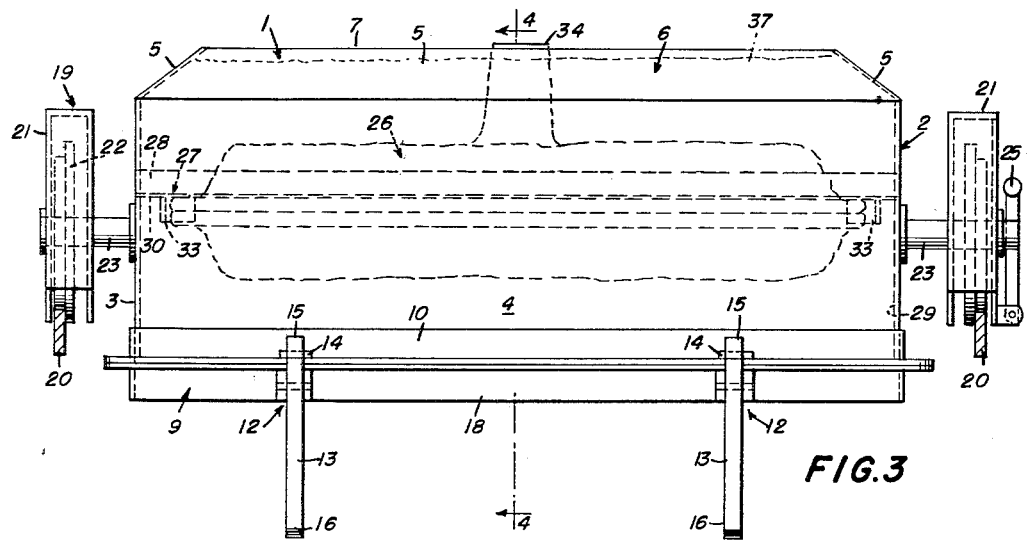
Figure 3 is an end elevational view on an enlarged scale of the box of Figure 2.
Figure 4:
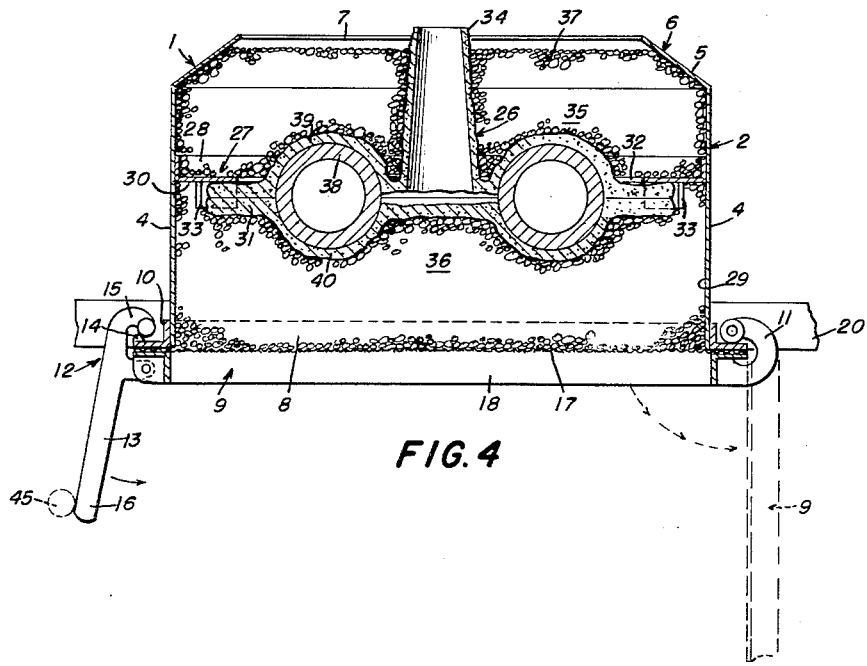
Figure 4 is a vertical sectional view taken along the lines 4—4 of Figure 3.

Of rectangular or other suitable shape, the improved mold box or flask, designated as 1, basically, is invertible and is open at the top and openable at the bottom for loading and dumping by gravity through both top and bottom. The other basic characteristics of the mold box are that it is adapted, when inverted, to support a mold intermediate its vertical extremities while being loaded or filled through the bottom and, except for very small castings, has at least its upper portion tapered, convergent, or of progressively decreasing cross-section towards its top. The mold box also, preferably, is mounted above floor level and has a foraminous bottom closure for escape of gases from the metal being cast.

In its preferred embodiment, the mold box 1 is rectangular and has a continuously lateral wall or side comprised of substantially flat, upstanding upright or vertically directed side walls 3 and end walls 4 connecting the side walls 3 at their ends. Surmounting or extending upwardly from each of the upstanding walls 3 and 4 and inturned or instanding therefrom is a substantially flat, upwardly sloping or inclined flange 5. Obliquely or angularly disposed relative to the associated of the upstanding walls 3 and 4 and connected or fixed at their lower edges to the walls and at their ends to and continuous with each other, the flanges 5 form an extension or upper part of the continuous lateral wall 2. They thus provide the mold box with an upwardly tapered or convergent upper or top portion 6, the latter being substantially frusto-pyramidal in the illustrated embodiment. At its upper extremity, the upper portion 6 surrounds bounds or confines a top opening 7 of somewhat smaller or restricted cross-section relative to the free area in the mold box between the upstanding walls 3 and 4.

The mold box 1 is open, unrestrictedly, at the bottom, having a bottom opening 8 surrounded, bounded, or confined by the lower extremities of the upstanding walls 3 and 4. While the bottom opening 8 may be fully closed during molding or may be made closable by means detachable from the mold box, it is preferred that it be closable by a drop bottom door or closure member 9 hinged to and forming part of the box. For this purpose the upstanding walls 3 and 4, desirably, are reinforced about the opening 8 by an angle-form or other suitable external or peripheral reinforcing frame or mounting 10, to a side or, as here, an end of which the drop door 9 is hingedly or swingably attached or connected by hinges 11.

The drop door 8 may be secured, locked or held in closed position, closing the opening 8, simply by a separate clamp or clamps. However, it is preferred that the locking or latching mechanism 12 be on the mold box and automatically trippable. While either the latch or the catch element of the mechanism 12 may be carried by the door and the other element by the frame 10, the latch element here is in the form of a pair of spaced latches or clamps 13 pivotally connected to and carried by the free end of the door and each engageable with a catch 14 carried by the adjoining end or side of the frame 10. The illustrated latches 13 have hooked upper ends 15 engageable with the catches and lever arms or tails 16 downstanding or projecting below the level of the door 9. In accordance with the preferred construction, the door 9 is made foraminous or perforated, conveniently by forming it of a screen 17, alignable and substantially coextensive in area with the bottom opening 8, and bounded by a rim 18 of angle or other suitable form, which, when the door is closed, abuts against the frame 10.

Also, according to the preferred construction, the mold box 1 is made invertible by mounting it on a four-wheeled carriage 19 ridable on a track or trackway 20 and having a pair of transversely or laterally spaced side frames 21, each supported on a pair of longitudinally spaced flanged wheels 22. The mold box may be pivotally supported, suspended or mounted between the side frames 21 for rotation about a horizontal axis by a pair of coaxial trunnions or stub axles 23, each fixed substantially centrally to and outstanding from opposite sides of the box, here, its side walls 3. The outer end of each trunnion 23 is suitably journaled in one of the side frames 21 intermediate the latter's wheels 22. To hold the mold box in either upright or inverted position, one of the trunnions 23 may have a transverse slot 24 in its outer end for receiving a keeper or lock bar 25 pivoted to the related or associated of the side frames 20.

Adapted to receive a mold 26 through its bottom opening 8 when the door 9 is swung open, the mold box 1 is designed to support the mold substantially midway of the box's vertical extremities on support means 27 instanding from the upstanding walls 3 and 4. For a skirted mold, such as that illustrated, the support means 27, suitably, may be an angle iron extending around and having one leg 28 attached to the inner faces 29 of the upstanding walls 3 and 4 and providing by its instanding leg 30, a substantially horizontally directed ledge or shelf against which the skirt 31 of the mold may rest. With its skirt 31 supported on the ledge 30, the mold 26 may be centered, laterally of the box, in the central opening 32 defined by the ledge by pinning its skirt to the ledge or, conveniently, by positioning or corner brackets 33, depending from the corners of the ledge. The sprue 34 of the mold 26 usually will be of such height or length as to project through the top opening 7 when the mold is in position in the mold box.

In shell molding, according to the present invention, with a mold box of the above-described construction, the mold box 1, then positioned at the loading station, will be inverted with its bottom opening 8 uppermost. The door 9 being open, the mold 26 will be inserted, sprue-down, into the mold box and positioned on the ledge or other supporting member 30. Covering the central opening 32, the mold with the ledge effectively partitions the mold box into upper and lower parts 35 and 36, respectively, and provides a floor for the, now uppermost, lower part 37. Thereupon, the lower part 36 is filled by gravity with gravel, shot or other backing material, indicated at 37, and after vibrating, if desired, the excess material is struck off. The striking off preferably is accomplished by a concave blade (not shown), to ensure, through the resultant mounding, that the door, when clamped closed, will press or squeeze the backing material 37 tightly against the underside of the mold 26.

Next, the keeper 25 by which the mold box was held in inverted position, is released and the mold box rotated or inverted on its trunnions 23 to upright position. Thereupon, the upper part 35 of the mold box is loaded by gravity with the backing material 37 and after vibrating the box or punching the material by hand to ensure filling of the corners under the top flanges 5, the excess material is struck off. The loaded mold box, usually with a pouring cup (not shown) over the upper end of the sprue 34, is then ready for molding or casting at the molding station.

With uniform distribution of the backing material assured by the sequential gravity loading through bottom and top, it is during the molding or casting operation that instanding upsloping flanges 5 of the upwardly tapered upper portion 6 come into play. The backing material 37 is held tight against the underside of the mold 26 both by the initial pressure of the door 9 and by the expansion of the mold under the internal pressure of the molten metal after pouring, the latter being indicated at 38. Despite the fact that it is open at all times through the top opening 7, the upper part 35 of the box also squeezes the backing material in it against the upper side of the mold 26 and without weights or other external or separate pressure-applying means. This is the function of the flanges 5 which, as the mold expands under internal pressure exert, by virtue of their inclination or obliquity, a wedging action or, more properly, counter-action which effectively locks the material 37 against upward movement within the upper part 35.

As previously mentioned, the weight of the backing material in the upper part 35 of the mold box alone suffices for very small castings. However, for other castings, the wedging action of the flanges 5 is essential. The inclination or angularity and inward extent of the flanges may vary over a wide range so long as they, together are sufficient to exert a downward pressure over the upper side of the mold. Thus, flanges inclined relative to the horizontal as much as 55° and as little as 25° are effective. As might be expected, the one practical limitation to the inclination is the progressively increasing difficulty of loading the upper part of the box if the flanges are too flat and it is for this reason that an inclination of around 45° is preferred. The extent of the overhang or inward projection of the flanges will of course depend somewhat on the inclination and the size of the mold box. With inclinations within the limits specified and for a box of ordinary size, a minimum flange width of about 2¼ inches has been found desirable.

With handling of the mold 26 limited to its placement in the mold box 1 and its sections or cope and drag, 39 and 40, thereafter held against lateral shifting and pressed together by the backing material 37, the mold sections require a minimum of preliminary bonding. Accordingly, the mounds or globs of bonding resin placed between the mold sections to mold them together may be much smaller than ordinarily needed with consequent better fitting of the sections, lesser finning and closer tolerances in the finished castings, tolerances of .005–.006 inch being held quite readily.

The precision of the product is further increased by the use of the foraminous bottom door 9, which with the mold box 1 supported during casting above ground level, enables the gases to vent or escape freely from the metal through both the top and bottom openings 7 and 8. This is of particular importance since the thermosetting resin in the sand-resin mixture of which the mold is formed ultimately is substantially burned out and the more rapid the cooling the less chance that the resin will be burned out before formation of the skin on the metal on which the precision obtainable in the casting depends. To the same end, it is preferred to use gravel rather than shot or sand for the backing material, the gravel being sufficiently porous for good venting and having relatively low heat retention.

After the molding operation has been completed, the mold box 1 is molded on its track 20 to the dumping station. There, instead of dumping its contents onto a shake-out floor in accordance with conventional foundry practice, the mold box dumps into separating and recovering apparatus 41 underlying the track 19 at the dumping station. The separating apparatus 40 is formed of a plurality of superimposed vibrator and conveyor screens, the upper screen 42 being sufficiently coarse to pass the gravel or other backing material 37 and the lower 43 of a mesh to retain gravel or shot and pass any fines. The screens 42 and 43 overlie a conveyor onto which any fines are dumped, such as those resulting from partial disintegration of the mold during molding. The upper screen 42 may lead to a magnetic or other separator (not shown) for separating the casting from pieces of the mold too large to pass the screen. The lower screen 43 in turn leads to the loading station where the clean gravel conveyed by it is ready for reuse. As preferred, the fines carried off by the bottom conveyor 44 may be discarded or, if suitable, used in making new molds.

The actual dumping of the contents of the mold box 1 onto the separating apparatus 41 is in two stages. The first occurs as the mold box arrives in position above the separating apparatus when the tails 16 of its latches 13 strike and are tripped by a trip rod 45 disposed below and cross-wise of the track 20, whereupon the door 9 drops open dumping the contents of the lower part 28 of the box onto the upper screen 42. Once its lower part is empty and the keeper 25 is released, either manually or automatically, the mold box will invert by itself, due to its then high center of gravity, and add the contents of its upper part 35 to the upper screen 42. The mold box then may be turned to the loading station to repeat its cycle.

From the above detailed description it will be apparent that there has been provided an improvement in shell molding, brought about mainly by use of an improved mold box, which not only increases the precision obtainable in shell molding but markedly reduces manual handling. In actual practice, the mold box, when used in conjunction with the preferred separating apparatus 41, has reduced the labor required in shell molding by about 80%. It should be understood that the described and disclosed embodiment is merely exemplary of the shell molding process and means of this invention and that all modifications are intended to be included which do not depart from either the spirit of the invention or the scope of the appended claims.

Having described the invention, what is claimed is:

1. In a shell molding process, the steps comprising inserting a shell mold into an invertible mold box through a bottom opening therein while said mold is in inverted position, filling the lower part of said mold in said position with backing material while supporting said mold intermediate vertical extremities of said box, closing said bottom opening, inverting said mold box, filling the upper part of said box above said mold with backing material through a top opening therein, pouring molten metal into said mold, moving said mold to a dumping station, dumping in sequence the contents of the lower and upper parts of said box into separating apparatus, and separating said contents for recovery of the casting and reuse of the backing material.

2. In a shell molding process, the steps comprising inserting a shell mold into an invertible mold box through a bottom opening therein while said mold is in inverted position, filling the lower part of said mold in said position with backing material while supporting said mold intermediate vertical extremities of said box, closing said bottom opening, inverting said mold box, filling the upper part of said box above said mold with backing material through a top opening therein, pouring molten metal into said mold, moving said mold to a dumping station, and dumping in sequence the contents of the lower and upper parts of said box.

3. In shell molding, the combination of a mold box open at top and bottom and invertible for sequential gravity loading with backing material through the bottom and then the top, means intermediate vertical extremities of said box for supporting a shell mold therein during bottom loading thereof, a door hinged to said box for closing said bottom opening, trippable latch means on one of said box and door for securing said door in closed position, a wheeled carriage invertibly mounting said mold box and ridable on a trackway, means positioned adjacent said trackway for tripping said latch means at a dumping station, and separating and recovery means disposed below said trackway at said station for receiving and separating the contents of said box.

4. In shell molding, the combination of a mold box open at top and bottom and invertible for sequential gravity loading with backing material through the bottom and then the top, means intermediate vertical extremities of said box for supporting a shell mold therein during bottom loading thereof, a door hinged to said box for closing said bottom opening, trippable latch means on one of said box and door for securing said door in closed position, a wheeled carriage invertibly mounting said mold box and ridable on a trackway, means positioned adjacent said trackway for tripping said latch means at a dumping station, a plurality of superimposed vibrator and conveyor screens of different mesh disposed below said trackway for receiving and separating the contents of said box according to size, and an underlying conveyor for catching any fines passed by a lower of said screens.

5. In shell molding, a mold box closed at the side and open at top and bottom, means releasably securable to said box for closing the bottom thereof, said box being invertible for sequential gravity loading and with backing material through the bottom and then the top and support means in and intermediate vertical extremities of said box and operative when said box is in inverted position for supporting a shell mold during the initial bottom loading of said box.

6. In shell molding, the combination of a mold box having a continuous lateral wall defining at opposite vertical extremities top and bottom openings in said box, means releasably securable to said box for closing said bottom opening, said box being invertible for sequential gravity loading with backing material through said bottom and then said top opening, and support means instanding from said wall intermediate vertical extremities thereof and operative when said box is in inverted position for supporting a shell mold during the initial loading of said box thereabove through said bottom opening.

7. In shell molding, the combination of a mold box having a continuous lateral wall defining at opposite vertical extremities top and bottom openings in said box, foraminous means releasably securable to said box for closing said bottom opening, said box being invertible for sequential gravity loading with backing material through said bottom and then said top opening, and support means instanding from said wall intermediate vertical extremities thereof and operative when said box is in inverted position for supporting a shell mold during the initial loading of said box thereabove through said bottom opening.

8. In shell molding, the combination of a mold box having a continuous lateral wall defining at its lower extremity a bottom opening in said box, said wall having an upwardly tapered upper portion defining at its upper extremity a top opening in said box, means releasably securable to said box for closing said bottom opening, said box being invertible for sequential gravity loading with backing material through said bottom and then said top opening, and support means instanding from said wall intermediate vertical extremities thereof and operative when said box is in inverted position for supporting a shell mold during the initial loading of said box thereabove through said bottom opening.

9. In shell molding, the combination of a mold box having a continuous lateral wall bounding at its lower extremity a bottom opening, continuous flange means extending inwardly and upwardly from said upstanding wall and bounding at its upper extremity a top opening, a foraminous bottom door hinged to said wall and having its free end releasably securable thereto for closing said bottom opening, means mounting said box for rotation between upright and inverted positions and sequential loading thereof with backing material through said bottom and then said top opening, and means instanding from said wall and effective when said box is in inverted position for supporting a shell mold intermediate vertical extremities of said box during loading of a lower part of said box.

10. In shell molding, the combination of a mold box open at top and bottom, said box being invertible for sequential loading by gravity with backing material through said bottom and then said top, detachable means for closing the bottom of said box, means intermediate vertical extremities of said box for supporting a shell mold during loading of said box in inverted position through said bottom, and means connected to and instanding from a side of said box and spaced above said supporting means when said boss is in upright position, said last-named means being operative on expansion of said mold under internal pressure of metal being cast for wedging backing material in the upper part of said box against an upper side of said mold.

11. In shell molding, the combination of a mold box having laterally spaced upstanding side walls, laterally spaced upstanding end walls connecting said side walls, said upstanding walls bounding a bottom opening in said box, upwardly converging flange means surmounting said upstanding walls and bounding at a top opening in said box, means outstanding from opposite of said upstanding walls and journalled in mounting means for rotation of said box between upright and inverted positions and sequential loading thereof through the bottom and then the top, means instanding from certain of said upstanding walls and effective when said box is inverted for seating a shell mold inserted thereinto through said bottom opening, said seating means and mold together partitioning said box into upper and lower parts each fillable by gravity with backing material in one of the upright and inverted positions of said box, and foraminous means releasably securable to said box for closing said bottom opening and pressing backing material in the lower part of said box against an underside of said mold, said flange means on expansion of said mold under internal pressure of metal being cast wedging the backing material in the upper part of said box against an upper side of said mold.

12. In shell molding, the combination of a mold box having a continuous upstanding wall bounding at its lower extremity a bottom opening in said box, upwardly converging flange means surmounting said upstanding wall and bounding a top opening in said box, means outstanding from opposite sides of said upstanding wall and journalled in mounting means for rotation of said box between upright and inverted positions and sequential loading thereof through the bottom and then the top, means instanding from said upstanding wall and effective when said box is inverted for seating a shell mold inserted thereinto through said bottom opening, said seating means and mold together partitioning said box into upper and lower parts each fillable by gravity with backing material in one of the upright and inverted positions of said box, and foraminous means releasably securable to said box for closing said bottom opening and pressing backing material in the lower part of said box against an underside of said mold, said flange means on expansion of said mold under internal pressure of metal being cast wedging the backing material in the upper part of said box against an upper side of said mold.

13. In shell molding, the combination of a mold box having laterally spaced upstanding side walls, laterally spaced upstanding end walls connecting said side walls, said upstanding walls bounding a bottom opening in said box, upwardly converging flange means surmounting said upstanding walls and bounding a top opening in said box, ledge means extending about an inner face of and instanding from said upstanding wall intermediate vertical extremities thereof for supporting a mold when said box is in inverted position, means outstanding from opposite of said upstanding walls and journalled in mounting means for rotation of said box between upright and inverted positions and sequential loading thereof through the bottom and then the top, means instanding from certain of said upstanding walls and effective when said box is inverted for seating a shell mold inserted thereinto through said bottom opening, said seating means and mold together partitioning said box into upper and lower parts each fillable by gravity with backing material in one of the upright and inverted positions of said box, and foraminous means releasably securable to said box for closing said bottom opening and pressing backing material in the lower part of said box against an underside of said mold, said flange means on expansion of said mold under internal pressure of metal being cast wedging the backing material in the upper part of said box against an upper side of said mold.

14. In shell molding, the combination of a mold box having a continuous upstanding wall bounding a bottom opening in said box, upwardly converging flange means surmounting said upstanding walls and bounding a top opening in said box, means outstanding from opposite sides of said upstanding walls and journalled in mounting means for rotation of said box between upright and inverted positions and sequential loading thereof through the bottom and then the top, ledge means extending about an inner face of and instanding from said upstanding wall intermediate vertical extremities thereof for supporting a shell mold when said box is in inverted position, means connected to said ledge means for centering said mold laterally of said upstanding wall, said ledge means and mold together partitioning said box into upper and lower parts each fillable by gravity with backing material in one of the upright and inverted positions of said box, and foraminous means releasably securable to said box for closing said bottom opening and pressing backing material in the lower part of said box against an underside of said mold, said flange means on expansion of said mold under internal pressure of metal being cast wedging the backing material in the upper part of said box against an upper side of said mold.

15. In shell molding, the combination of a wheeled carriage mounted on a trackway and having a pair of laterally spaced side frames, a mold box mounted between said side frames for rotation about a horizontal axis between upright and inverted positions, said mold box having an upstanding continuous wall bounding at its lower extremity a bottom opening in said box, upwardly converging flange means surmounting said upstanding wall and bounding a top opening in said box, means instanding from said upstanding wall and effective when said box is inverted for seating a shell mold inserted thereinto through said bottom opening, said seating means and mold together partitioning said box into upper and lower parts each fillable by gravity with backing material through the related of said openings in one of the upright and inverted positions of said box, said parts being fillable in sequence through said bottom and then said top opening, and foraminous means releasably securable to said box for closing said bottom opening and pressing backing material in the lower part of said box against an underside of said mold, said flange means on expansion of said mold under internal pressure of metal being cast wedging the backing material in the upper part of said box against an upper side of said mold.

16. In shell molding, the combination of a mold box having a continuous upstanding wall member bounding a bottom opening in said box, upwardly converging flange means surmounting said upstanding wall member and bounding a top opening in said box, means outstanding from said upstanding wall member and journalled in mounting means for rotation of said box between upright and inverted positions and sequential filling thereof through the bottom and then the top, means instanding from said upstanding wall member and effective when said box is inverted for seating a shell mold inserted thereinto through said bottom opening, said seating means and mold together partitioning said box into upper and lower parts each fillable by gravity with backing material in one of the upright and inverted positions of said box, said flange means on expansion of said mold under internal pressure of metal being cast wedging the backing material in the upper part of said box against an upper side of said mold, a foraminous drop bottom door member hinged at one end to said wall member for closing said bottom opening, and latch means carried by one of said door and wall members and engageable with catch means carried by the other member for securing said door member in closed position and therethrough pressing backing material in a lower part of said box against an underside of said mold.

17. In shell molding, the combination of a wheeled carriage mounted on a trackway and having a pair of laterally spaced side frames, a mold box mounted between said side frames for rotation about a horizontal axis between upright and inverted positions, said mold box having an upstanding continuous wall bounding at its lower extremity a bottom opening in said box, upwardly converging flange means surmounting said upstanding wall and bounding a top opening in said box, means instanding from said upstanding wall and effective when said box is inverted for seating a shell mold inserted thereinto through said bottom opening, said seating means and mold together partitioning said box into upper and lower parts each fillable by gravity with backing material through the related of said openings in one of the upright and inverted positions of said box, said parts being fillable in sequence through said bottom and then said top opening, said flange means on expansion of said mold under internal pressure of metal being cast wedging the backing material in the upper part of said box against an upper side of said mold, a foraminous drop bottom door member hinged at one end to said wall member for closing said bottom opening, trippable latch means carried by one of said door and wall members and engageable with catch means carried by the other member for securing said door member in closed position and therethrough pressing backing material in a lower part of said box against an underside of said mold, and means associated with said trackway and positioned to trip said latch means on movement of said box to a dumping station.

18. In shell molding, the combination of a mold box having laterally spaced upstanding side walls, laterally spaced upstanding end walls connecting said side walls, said upstanding walls bounding a bottom opening in said box, upwardly converging flange means surmounting said upstanding walls and bounding a top opening in said box, means outstanding from opposite of said upstanding walls and journalled in mounting means for rotation of said box between upright and inverted positions and sequential filling thereof through the bottom and then the top, means carried by said mounting means and releasably engageable with said outstanding means for holding said box in one of said upright and inverted positions, means instanding from certain of said upstanding walls and effective when said box is inverted for seating a shell mold inserted thereinto through said bottom opening, said seating means and mold together partitioning said box into upper and lower parts each fillable by gravity with backing material in one of the upright and inverted positions of said box, and foraminous means releasably securable to said box for closing said bottom opening and pressing backing material in the lower part of said box against an underside of said mold, said flange means on expansion of said mold under internal pressure of metal being cast wedging the backing material in the upper part of said box against an upper side of said mold.

19. In shell molding, the combination of a mold box having laterally spaced upstanding side walls, laterally spaced upstanding end walls connecting said side walls, said upstanding walls bounding a bottom opening in said box, upwardly converging flange means surmounting said upstanding walls and bounding a top opening in said box, means outstanding from opposite of said upstanding walls and journalled in mounting means for rotation of said box between upright and inverted positions and sequential filling thereof through the bottom and then the top, means carried by said mounting means and releasably engageable with said outstanding means for holding said box in one of said upright and inverted positions, means instanding from certain of said upstanding walls and effective when said box is inverted for seating a shell mold inserted thereinto through said bottom opening, said seating means and mold together partitioning said box into upper and lower parts each fillable by gravity with backing material in one of the upright and inverted positions of said box, a foraminous drop bottom door for closing said bottom opening, said door being hingedly connected to one of said upstanding walls, and latch means carried by a free end of said door and engageable with catch means connected to a corresponding of said upstanding walls for securing said door in closed position.

References Cited in the file of this patent

UNITED STATES PATENTS

| | | |
|---|---|---|
| 177,395 | Hammer | May 16, 1876 |
| 526,113 | Morris | Sept. 18, 1894 |
| 580,205 | Barnett | Apr. 6, 1897 |
| 738,372 | Strauch | Sept. 8, 1903 |
| 818,927 | Waite | Apr. 24, 1906 |
| 1,119,680 | Brown | Dec. 1, 1914 |
| 1,658,456 | Meyer | Feb. 7, 1928 |
| 2,559,647 | Legere | July 10, 1951 |
| 2,746,104 | Valyi | May 22, 1956 |
| 2,800,692 | Cooke | July 30, 1957 |

OTHER REFERENCES

Foundry, vol. 81, pages 178–184, November 1953.
Foundry, vol. 81, pages 156–158, October 1953.